Jan. 26, 1965  H. HOFFMANN  3,166,990
ASSEMBLY WITH RELATIVELY DISPLACEABLE MEMBERS
Filed Jan. 11, 1963  2 Sheets-Sheet 1

HELMUTH HOFFMANN
INVENTOR.

BY Mestern, Ross & Mestern

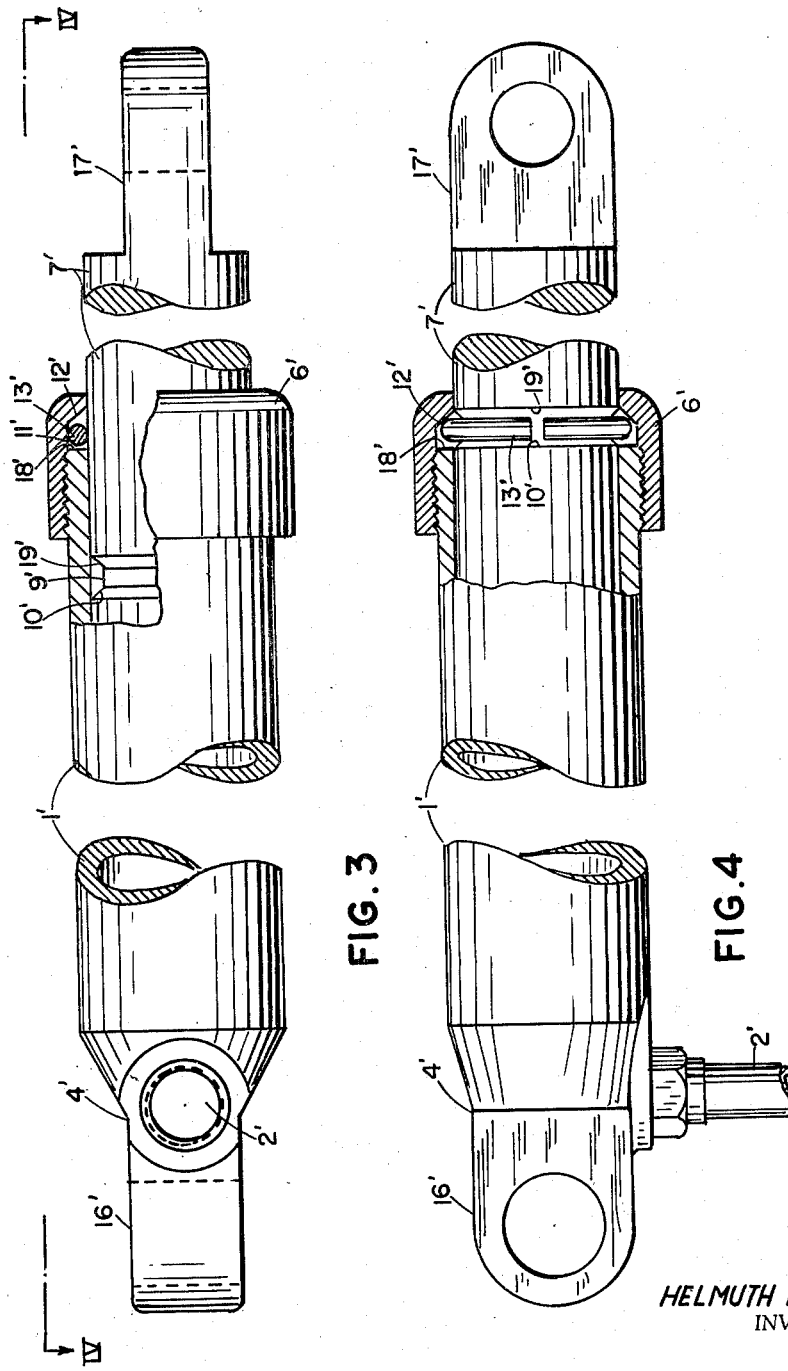

United States Patent Office 3,166,990
Patented Jan. 26, 1965

3,166,990
ASSEMBLY WITH RELATIVELY DISPLACEABLE MEMBERS
Helmuth Hoffmann, Bad Homburg vor der Hohe, Germany, assignor to Alfred Teves, KG., Frankfurt am main, Germany, a corporation of Germany
Filed Jan. 11, 1963, Ser. No. 250,905
Claims priority, application Germany Mar. 2, 1962
6 Claims. (Cl. 92—30)

My present invention relates to an assembly wherein two relatively displaceable members, such as a piston and a cylinder telescoped one within the other, are to be relatively reciprocated between predetermined limits.

In many instances it is desirable, for the purpose of realizing a compact piston-and-cylinder assembly, to form the piston with a substantially continuous peripheral surface of constant diameter projecting from the open-ended cylinder so that piston head and piston rod merge into each other without any shoulders or steps that would structurally weaken the piston and increase its tendency to buckle under axial pressure. Such a continuous construction is particularly important in the case of a small-caliber cylinder used, for example, as part of a hydraulic jack. Although the stroke of a piston so shaped will be limited at one point by the engagement of the piston with the closed end of the cylinder, the other stroke limit could hitherto be positively determined only if either the piston or the cylinder were formed with one or more longitudinal peripheral grooves coacting with studs in the other member. If these grooves are provided in the piston, they tend to reduce its bending strength and buckling resistance; if they are present in the cylinder, they restrict the extent to which the piston can be displaced without venting the interior of the cylinder to the atmosphere.

It is, therefore, the object of my present invention to provide means for arresting a piston and a cylinder, or more generally any two relatively movable members contacting each other over an extended surface, in safe, dependable manner without any appreciable weakening of the structure of either member.

This object is realized, in accordance with the instant invention, by the provision of at least one relatively deep recess in one member and at least one relatively shallow recess in the other member, the two recesses being open toward their common contact surface and being alignable with each other in a predetermined relative position representing one of the limits of the intended displacement stroke. A shear-resistant coupling element is fully retractable into the deeper recess but is resiliently biased toward the shallower recess in which it is only partly receivable. The recesses are formed with two pairs of flanks which, in the aligned position of the recesses, bear upon the coupling element at diametrically opposite points of its cross-section upon a relative displacement of said members in one or the other direction, thus (if a telescoped assembly is considered) with the piston moving inward or outward with reference to the cylinder; these flanks are so shaped as to exert upon the coupling element a resultant camming force which in the first case (piston moving inwardly) has a component directed toward the member provided with the deeper recess but lacks such component in the second case (piston moving outwardly) whereby the coupling element locks the two members against further relative displacement in the last-mentioned sense.

Although in a piston-and cylinder assembly a plurality of deeper recesses and a like plurality of shallower recesses of the character described might be disposed at angularly spaced locations about the cylinder axis, with suitable (e.g. spherical) coupling elements received therein, I prefer to use only two annular recesses, one in each member, occupied by a single ring-shaped coupling element. This coupling element is advatangeously of circular cross-section, the depth of the shallower recess being less than the radius of that cross-section whereas the depth of the deeper recess is at least equal to the cross-sectional diameter. At least one of the flanks of the deeper recess is beveled and includes with the contact surface substantially the same angle as the coacting flank of the shallower recess, these two flanks being thus essentially parallel and clamping the coupling element between them without exerting any camming action thereon; the other flank of the shallower recess is beveled at an opposite angle substantially less than the angle of the remaining flank of the deeper recess which may in fact be perpendicular to the contact surface and therefore to the cylinder axis. The two last-mentioned flanks, accordingly, coact to cam the coupling element into the deeper recess, against its biasing force, in the nonlocking direction of displacement so that the system operates strictly as a unidirectional stop.

The invention will be described in greater detail with reference to the accompanying drawing in which:

FIG. 3 is a view generally similar to FIG. 1, illustrating a modification; and

FIG. 4 is a view generally similar to FIG. 2, taken substantially on the line IV—IV of FIG. 3.

Figure 1:
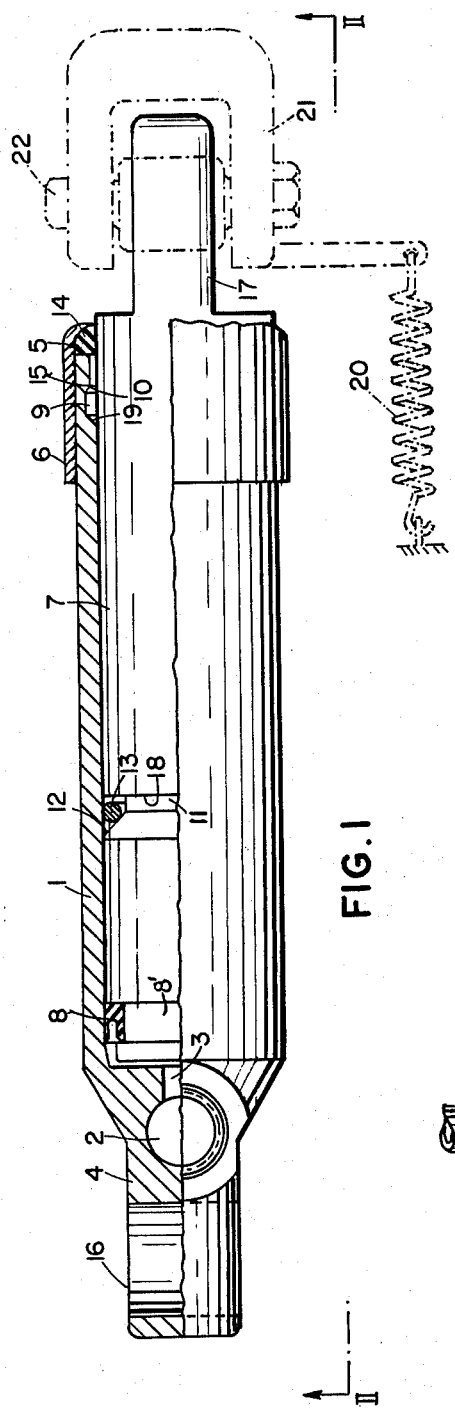
FIG. 1 is a side-elevational view, partly in axial section, of a piston-and-cylinder assembly embodying the invention.
Figure 2:
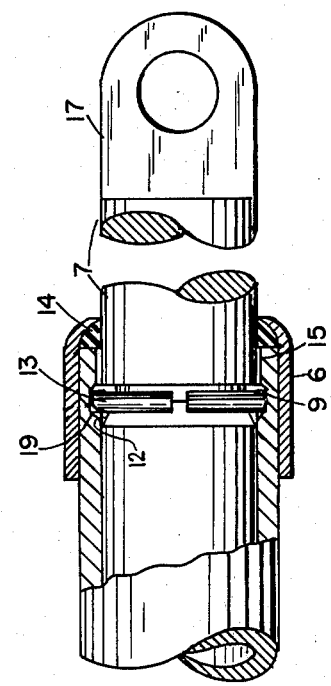
FIG. 2 is a view (parts broken away) taken substantially on the line II—II of FIG. 1 but with the members in a different relative position.
Figure 2:
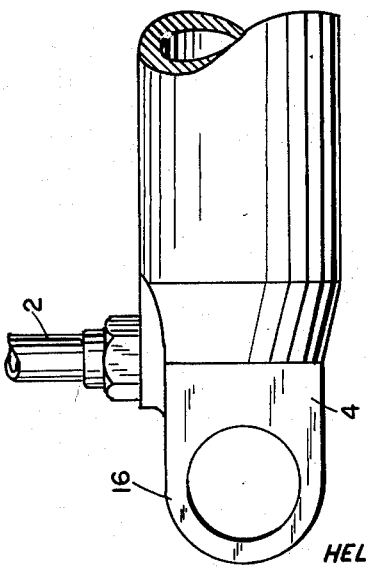

In FIGS. 1 and 2 there is shown a cylinder 1 having a closed end 4 and an open end 5. A conduit 2 serves to admit a pressure fluid, such as air, steam or oil, into a port 3 provided in the closed end of the cylinder. The port 3 communicates with the interior of the cylinder within which a piston 7 is axially slidable, this piston being of constant diameter over nearly its entire length and substantially continuous except for an annular recess 11 formed in its peripheral surface at an intermediate location and a recess 8' at one end as will be apparent hereinafter. An annular recess 9, of similar width but lesser depth, is formed in the inner peripheral wall of the cylinder 1 adjacent its open end 5. A packing ring 14 of resilient material embraces the projecting part of piston 7 and is held in place by a cap 6 press-fitted onto the rear cylinder end 5. Another packing ring 8 is carried in an annular recess 8' on the inserted forward end of the piston 7 to form a seal against the cylinder wall.

The annular recess 11 is of trapezoidal cross-section with a beveled forward flank 12 and a rear flank 18 lying in a radial plane of the piston. Recess 9 is also trapezoidal in cross-section and has two oppositely beveled flanks 10 and 19, the generatrices of rear flank 10 paralleling those of the forward flank 12 of recess 11. A split coupling ring 13 is lodged in the deeper recess 11 and is fully retracted therein as illustrated in FIG. 1, the resiliency of this ring urging it radially outwardly toward the shallower recess 9 into which it snaps when the parts are in their terminal position shown in FIG. 2. Since the flanks 10 and 12 exert equal and opposite camming forces upon the ring 13 in the position of FIG. 2, there is no inward component available to overcome the biasing force tending to maintain the ring 13 partly within the shallower recess 9; thus, the piston 7 will not be movable out of the cylinder 1 beyond the position shown in that figure.

It will be noted that the ring 13 has a circular cross-section whose radius exceeds the depth of recess 9 so that the greater part of the ring will be received in recess 11 when the members 1, 7 are in their terminal position shown in FIG. 2; thus, the straight rear flank 18 of recess 11 bears equatorially upon the ring 13 when the piston 7 is moved inwardly, this flank therefore failing to apply to the ring an outward pressure counteracting the inwardly directed radial component of the camming force exerted under these conditions by the forward flank 19 of recess 9. The ring 13, accordingly, will yield inwardly against its spring force to permit the piston to move again toward the other limit of its stroke illustrated in FIG. 1. Such return motion might be brought about, for example, by one or more restoring springs 20 anchored to a connecting rod 21 which is articulated at 22 to an eye 17 on the rear extremity of the piston, the pressure fluid being of course discharged through the duct 2 or some other outlet during that part of the cycle. The control valves or the like used to admit and discharge the fluid have not been illustrated since such arrangements are well known per se and do not form part of the present invention.

The cylinder bore is slightly widened at 15, between the recess 9 and the open end 5, to enable the insertion of one or more tools (upon removal of cap 6 and ring 14) for wedging the ring 13 out of the recess 9 when it is desired to disassemble the unit. The front end of cylinder 1 is shown provided with a hole 16 by which it may be attached to a fixed base or some other structural element, it being apparent that the unit 1, 7 may operate as a hydraulic jack in an extensible linkage which includes the rod 21.

In FIGS. 3 and 4 I have shown an assembly which is generally similar to that previously described but wherein the positions of the deep and shallow recesses have been reversed. The cylinder 1' is again provided with a fluid conduit 2' at its closed forward end 4'. The shallow recess 9' with its beveled flanks 10' and 19' is here formed in the piston 7' whereas the deep recess 11' is provided in the peripheral wall of the rear extremity of cylinder 1' here shown as constituted, in order to facilitate disassembly, by a detachable cap 6' screwed onto the main body of the cylinder. Because of the reversal of the recesses, the steep flank 18' of recess 11' is now in the forward position whereas its inclined flank 12' is to the rear of coupling ring 13'. Again, as in the preceding embodiment, diametrically opposite flanks 10', 12' of the two recesses (as viewed with reference to the circular cross-section of the ring) are inclined at the same angle with reference to the contact surface of the two telescoping members. It will be apparent that, in accordance with the principles discussed above, piston 7' cannot be withdrawn from cylinder 1' beyond the position shown in FIG. 4.

The invention in its broader aspects is, of course, not limited to a piston-and-cylinder assembly but may be utilized in conjunction with other members that are relatively reciprocable and contact each other over an extended surface throughout their range of reciprocation. Modifications of the systems specifically shown in the drawing are, therefore, possible without departing from the spirit and scope of the invention as defined in the appended claims.

I claim:

1. An assembly comprising two telescoped cylindrical members contacting each other over an extended surface defined by their respective peripheries, said members being relatively axially displaceable along said surface; one of said members being provided with a relatively deep annular peripheral recess, the other of said members being provided with a relatively shallow annular peripheral recess, said recesses being alignable with each other in a predetermined relative axial position of said members, and a resilient coupling ring in said relatively deep recess fully retractable into same but elastically biased in radial direction toward said relatively shallow recess, said ring being only partly receivable in the latter recess; said recesses having two pairs of mutually opposite flanks bearing on said ring upon relative axial displacement of said members in a first and a second direction, respectively, with a resultant camming force which with said first direction of displacement has a radial component directed toward the member having said relatively deep recess but lacks such component with said second direction of displacement whereby said ring locks said members against further axial displacement in said second direction beyond said predetermined relative position thereof.

2. An assembly as defined in claim 1 wherein the flanks of said relatively shallow recess are beveled, one of the flanks of said relatively deep recess being beveled and inclined with reference to said surface at substantially the same angle as the diagonally opposite flank of said relatively shallow recess, the other flank of said relatively deep recess including with said surface an angle substantially larger than that included with said surface with the remaining flank of said relatively shallow recess.

3. In combination, a cylinder member with a closed end and an open end; a piston member of substantially constant diameter matingly received in said cylinder member for relative axial displacement and projecting from the open end thereof, said cylinder member being provided with conduit means for admitting a pressure fluid into its interior near said closed end and discharging said fluid therefrom; one of said members being provided with a relatively deep peripheral recess, the other of said members being provided with a relatively shallow peripheral recess, said recesses being alignable with each other in a predetermined relative axial position of said members in which said piston member is spaced from said closed end, and a coupling element of circular cross-section in said relatively deep recess fully retractable into same but radially biased resiliently toward said relatively shallow recess, said element being only partly receivable in the latter recess whose depth is less than the radius of said cross-section; said recesses having two pairs of mutually opposite flanks respectively bearing on said element upon inward and outward displacement of said piston member relative to said cylinder member with a resulting camming force which upon inward piston displacement has a radial component directed toward the member having said relatively deep recess but lacks such component upon outward piston displacement whereby said element locks said member against further outward piston displacement beyond said predetermined relative position of said members.

4. In combination, a cylinder member with a closed end and an open end; a piston member of substantially constant diameter matingly received in said cylinder for relative axial displacement and projecting from the open end thereof, said cylinder member being provided with conduit means for admitting a pressure fluid into its interior near said closed end and discharging said fluid therefrom; one of said members being provided with a relatively deep annular peripheral recess, the other of said members being provided with a relatively shallow annular peripheral recess, said recesses being alignable with each other in a predetermined relative axial position of said members in which said piston member is spaced from said closed end, and a resilient coupling ring in said relatively deep recess fully retractable into same but elastically biased in radial direction toward said relatively shallow recess, said ring being only partly receivable in the latter recess; said recesses having two pairs of mutually opposite flanks respectively bearing on said ring upon inward and outward displacement of said piston member relative to said cylinder member with a resultant camming force which upon inward piston displacement has a radial component directed toward the member having said relatively deep recess but lacks such component upon outward piston displacement whereby said ring locks said members against further outward piston displacement beyond said predetermined relative position of said members.

5. In combination, a cylinder member with a closed end and an open end; a piston member of substantially constant diameter matingly received in said cylinder member for relative axial displacement and projecting from the open end thereof, said cylinder member being provided with conduit means for admitting a pressure fluid into its interior near said closed end and discharging said fluid therefrom; one of said members being provided with a relatively deep annular peripheral recess, the other of said members being provided with a relatively shallow annular peripheral recess, said recesses being alignable with each other in a predetermined relative axial position of said members in which said piston member is spaced from said closed end, and a resilient coupling ring of circular cross-section in said relatively deep recess fully retractable into same but elastically biased in radial direction toward said relatively shallow recess, said ring being only partly receivable in the latter recess whose depth is less than the radius of said cross-section; said recesses having two pairs of mutually opposite flanks respectively bearing on said ring upon inward and outward displacement of said piston member relative to said cylinder member with a resultant camming force which upon inward piston displacement has a radial component directed toward the member having said relatively deep recess but lacks such component upon outward piston displacement whereby said ring locks said members against further outward piston displacement beyond said predetermined relative position of said members.

6. The combination defined in claim 5 wherein the flanks of said relatively shallow recess are beveled, one of the flanks of said relatively deep recess being beveled and inclined with reference to said surface at substantially the same angle as the diagonally opposite flank of said relatively shallow recess, the other flank of said relatively deep recess including with said surface an angle substantially larger than that included with said surface by the remaining flank of said relatively shallow recess.

References Cited in the file of this patent
UNITED STATES PATENTS

| | | |
|---|---|---|
| 2,163,982 | Mercier | June 27, 1939 |
| 2,204,279 | Meyer | June 11, 1940 |
| 2,449,516 | Shakespeare et al. | Sept. 14, 1948 |
| 2,996,046 | Skopp et al. | Aug. 15, 1961 |
| 3,010,752 | Geffner | Nov. 28, 1961 |